United States Patent
Sankaranarayanan et al.

(10) Patent No.: US 12,093,743 B2
(45) Date of Patent: Sep. 17, 2024

(54) CLOUD BASED MACHINE LEARNING NOTEBOOK FEATURE ENGINEERING COMMAND RECOMMENDER

(71) Applicant: Oracle International Corporation, Redwood Shores, CA (US)

(72) Inventors: Hari Bhaskar Sankaranarayanan, Bangalore (IN); Viral Rathod, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 507 days.

(21) Appl. No.: 17/550,955

(22) Filed: Dec. 14, 2021

(65) Prior Publication Data

US 2023/0185626 A1 Jun. 15, 2023

(51) Int. Cl.
  *G06F 9/50* (2006.01)
  *G06F 9/38* (2018.01)
  *G06N 20/00* (2019.01)

(52) U.S. Cl.
  CPC .......... *G06F 9/5072* (2013.01); *G06F 9/3836* (2013.01); *G06N 20/00* (2019.01)

(58) Field of Classification Search
  CPC ...... G06F 9/5072; G06F 9/3836; G06N 20/00
  See application file for complete search history.

(56) References Cited

U.S. PATENT DOCUMENTS

| | | |
|---|---|---|
| 9,384,184 B2 | 7/2016 | Acuña et al. |
| 2014/0282178 A1 | 9/2014 | Borzello et al. |
| 2020/0081916 A1* | 3/2020 | McShane ............... G06N 20/00 |
| 2021/0019321 A1* | 1/2021 | Ehrlich .................. G06N 20/00 |
| 2022/0113964 A1* | 4/2022 | Wang ........................ G06F 8/73 |
| 2022/0172038 A1* | 6/2022 | Chen ...................... G06N 3/045 |
| 2023/0049167 A1* | 2/2023 | Wilson ............ G06V 30/19107 |
| 2023/0177261 A1* | 6/2023 | Clement ................ G06N 3/045 |
| | | 704/9 |

OTHER PUBLICATIONS

Ewbank, "Kite Adds Jupyter Integration," I-Programmer, Aug. 2020, pp. 1-3, retrieved from: https://www.i-programmer.info/index.php?option=com_ninjarsssyndicator&feed_id=1&format=raw.

(Continued)

*Primary Examiner* — Dong U Kim
(74) *Attorney, Agent, or Firm* — Potomac Law Group, PLLC

(57) ABSTRACT

Embodiments operate a machine learning ("ML") notebook in a cloud infrastructure executing a plurality of ML notebooks. Embodiments receive a plurality of previously executed ML notebook feature engineering commands from the plurality of ML notebooks. Embodiments store the plurality of previously executed ML notebook feature engineering commands, including a relationship between the feature engineering commands. Embodiments mine the stored commands to generate feature engineering sets of feature engineering commands, the feature engineering sets comprising feature engineering commands that are frequently used together and an order of use of the feature engineering commands. Embodiments then receive a context of a current feature engineering command and data used in the context and recommend a next feature engineering command to be executed after the current feature engineering command.

20 Claims, 11 Drawing Sheets

(56) References Cited

OTHER PUBLICATIONS

John et al., "Ava: From Data to Insights Through Conversation," Proceedings of the 8th Biennial Conference on Innovative Data Systems Research, 2017, Chaminade, California, pp. 1-10.

Khas et al., "Automate feature engineering pipelines with Amazon SageMaker," AWS Machine Learning Blog, May 2021, pp. 1-9, retrieved on Sep. 2021, retrieved from:https://aws.amazon.com/blogs/machine-learning/automate-feature-engineering-pipelines-with-amazon-sagemaker/.

Lee et al., "Lux: Always-on Visualization Recommendations for Exploratory Data Science [Technical Report]," ArXiv, Apr. 2021, vol. abs/2105.00121, pp. 1-15, Cornell University.

Milo et al., "Next-Step Suggestions for Modern Interactive Data Analysis Platforms Technical Report," Proceedings of the 24th ACM SIGKDD International Conference on Knowledge Discovery & Data Mining, 2018, pp. 1-26.

Unknown, "Machine Learning Assists Python," Aristek Systems, 2018, pp. 1-8, Retrieved on 2021, Retrieved from: https://aristeksystems.com/blog/machine-learning-assists-python-code-completion/.

Yan et al., "Auto-Suggest: Learning-to-Recommend Data Preparation Steps Using Data Science Notebooks," Proceedings from the Research 17: Data Exploration and Preparation, SIGMOD '20, Jun. 2020, Portland, Oregon, pp. 1539-1554.

\* cited by examiner

CLOUD BASED MACHINE LEARNING NOTEBOOK FEATURE ENGINEERING COMMAND RECOMMENDER

FIELD

One embodiment is directed generally to a computer system, and in particular to the recommendation of machine learning notebook feature engineering commands within a computer system.

BACKGROUND INFORMATION

Cloud service providers provide various services in the "cloud", meaning over a network, such as the public Internet, and remotely accessible to any network-connected client device. Examples of the services models used by cloud service providers (also referred to herein as "cloud providers" or "providers") include infrastructure as a service ("IaaS"), platform as a service ("PaaS"), software as a service ("SaaS"), and network as a service ("NaaS"). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to a customer on a subscription basis, and is centrally hosted by the cloud provider. Under this model, applications can be accessed, for example, using a web browser. NaaS providers provide network services to customers, for example, by provisioning a virtual network on the network infrastructure operated by another party. In each of these service models, the cloud service provider maintains and manages the hardware and/or software that provide the services, and little, if any, software executes on a user's device.

Customers of cloud service providers, which are also referred to herein as users and tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users.

One service provided by cloud service providers is developing, training, and using machine learning models. The cloud makes it easy for enterprises to experiment with machine learning capabilities and scale up as projects go into production and demand increases. The cloud makes intelligent capabilities accessible without requiring advanced skills in artificial intelligence or data science. In conjunction with machine learning models, cloud services typically provide machine learning notebooks to facilitate the development and use of the models. Machine learning notebooks are highly-interactive multi-purpose tools that not only allow a developer or data scientist to write and execute code but, at the same time, analyze intermediate results to gain insights (using tables or visualizations) while working on a project.

SUMMARY

Embodiments operate a machine learning ("ML") notebook in a cloud infrastructure executing a plurality of ML notebooks. Embodiments receive a plurality of previously executed ML notebook feature engineering commands from the plurality of ML notebooks. Embodiments store the plurality of previously executed ML notebook feature engineering commands, including a relationship between the feature engineering commands. Embodiments mine the stored commands to generate feature engineering sets of feature engineering commands, the feature engineering sets comprising feature engineering commands that are frequently used together and an order of use of the feature engineering commands. Embodiments then receive a context of a current feature engineering command and data used in the context and recommend a next feature engineering command to be executed after the current feature engineering command.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Figure 1:
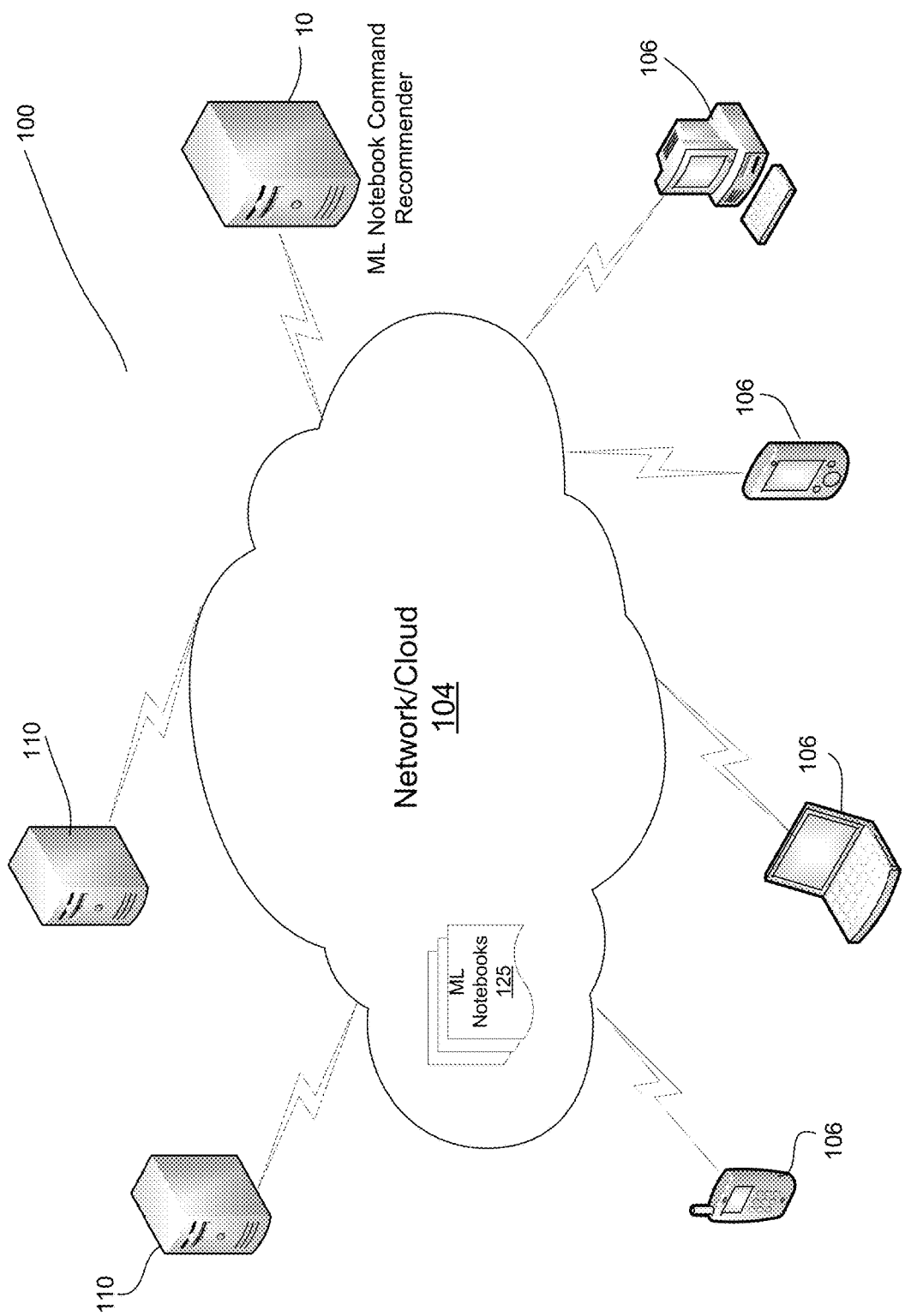
FIG. 1 illustrates an example of a system that includes an ML notebook command recommender system in accordance to embodiments.

In machine learning ("ML"), feature engineering is the process of using domain knowledge of the data to create features that enable machine learning algorithms to work. If feature engineering is done correctly, it increases the predictive power of machine learning algorithms by creating features from raw data that help facilitate the machine learning process. Feature engineering involves taking whatever information is known about the machine learning problem and turning it into numbers that can be used to build a feature matrix.

Feature engineering tasks include features for representing categorical data, features for representing text, and features for representing images. Further, derived features can be used for increasing model complexity and imputation of missing data. This process is known as vectorization, as it involves converting arbitrary data into well-behaved vectors.

In general, all machine learning algorithms use some input data to create outputs. This input data includes features, which are usually in the form of structured columns. Algorithms require features with some specific characteristic to work properly, which leads to the need for feature engineering. Feature engineering generally has at least two goals: (1) preparing the proper input data set, compatible with the machine learning algorithm requirements; and (2) improving the performance of the machine learning models. In general, feature engineering refers to the process of using mathematical knowledge along with some domain knowledge to select and transform the most relevant variables from the raw data when creating a predictive model using machine learning.

Embodiments, during the feature engineering phase within a ML notebook environment, provide suggested recommendations on next feature engineering steps/commands based on the current context, previous commands, and the result of the outputs in previous feature engineering steps. The suggestions are mined as part of a frequent item set or Apriori algorithm. The recommendation can be a single step or set of next steps through the association data mining techniques of all ML notebook commands stored in a graph database.

For example, a data scientist working with a ML notebook may load a dataset and plots pair plot. Embodiments may provide suggestions as a next feature engineering step to perform principal component analysis, or automatically calculate a regression co-efficient, if the scientist is executing linear regression related commands. As another example, embodiments may recommend hyper parameters, number of layers for neural network, learning rate, etc., based on prior knowledge of a similar problem if the data scientist is performing image classification experiments. The data scientist can either select the recommendation to run as a next step or discard it. Embodiments continuously learn from the interactions and keep improving the further recommendations adaptively through a collaborative filtering approach.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates an example of a system 100 that includes an ML notebook command recommender system 10 in accordance to embodiments. ML notebook command recommender system 10 may be implemented within a computing environment that includes a communication network/cloud 104. Network 104 may be a private network that can communicate with a public network (e.g., the Internet) to access services 110 provided by a cloud services provider. Examples of communication networks include a mobile network, a wireless network, a cellular network, a local area network ("LAN"), a wide area network ("WAN"), other wireless communication networks, or combinations of these and other networks. ML notebook command recommender system 10 may be administered by a service provider, such as via the Oracle Cloud Infrastructure ("OCP") from Oracle Corp.

Tenants of the cloud services provider can be organizations or groups whose members include users of services offered by service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of ML notebook command recommender system 10 of assisting the ML notebook feature engineering process. As disclosed herein, a "client" (also disclosed as a "client system" or a "client device") may be a device or an application executing on a device. System 100 includes a number of different types of client devices 106 that each is able to communicate with network 104.

Executing on cloud 104 is a plurality of ML notebooks 125. Each ML notebook 125 can be executed by a customer of cloud 104. In embodiments, each customer can use multiple notebooks 125, but a single notebook 125 is not shared by multiple customers. In general, ML or "data science" notebooks 125 have become an integral tool for data scientists across the world. ML notebooks 125 are highly-interactive multi-purpose tools that allow a data scientist to write and execute code and, at the same time, analyze intermediate results to gain insights, using tables or visualizations, while working on a project. Example ML notebooks include the open source "Jupyter Notebook" and "Apache Zeppelin" ML notebooks. ML notebooks 125 are generally implemented as a computational interpreter. In general, embodiments can be implemented with any type of ML notebooks that interface with an ML notebook server, including the Jupyter Notebook and any other Python based notebook (referred to generically as a "Python notebook").

In one embodiment, "Oracle Machine Learning Notebooks" from Oracle Corp. are implemented as ML notebooks 125. Oracle ML Notebooks provide a collaborative user interface for data scientists and business and data analysts who perform machine learning in Oracle Autonomous Database-both Autonomous Data Warehouse ("ADW") and Autonomous Transaction Processing ("ATP"). Oracle Machine Learning Notebooks enable data scientists, citizen data scientists, and data analysts to work together to explore their data visually and develop analytical methodologies. An interface provides access to high performance, parallel and scalable in-database implementations of machine learning algorithms via SQL and PL/SQL, with support for Python and R. Oracle ML Notebooks use Apache Zeppelin technology, enabling teams to collaborate to build, assess, and deploy machine learning models. Multi-user collaboration enables the same notebook to be opened simultaneously by different users, such that notebook changes made by one user are instantaneously reflected to notebook viewers.

In general, a ML notebook includes a sequence of cells. A cell is a multiline text input field. The execution behavior of a cell is determined by the cell's type. For embodiments that implement the Jupyter Notebook, there are three types of cells: code cells, markdown cells, and raw cells. Every cell starts off being a code cell, but its type can be changed by using a drop-down on the toolbar (which will be "Code", initially), or via keyboard shortcuts, and each cell can be a multiline input file.

Figure 2:
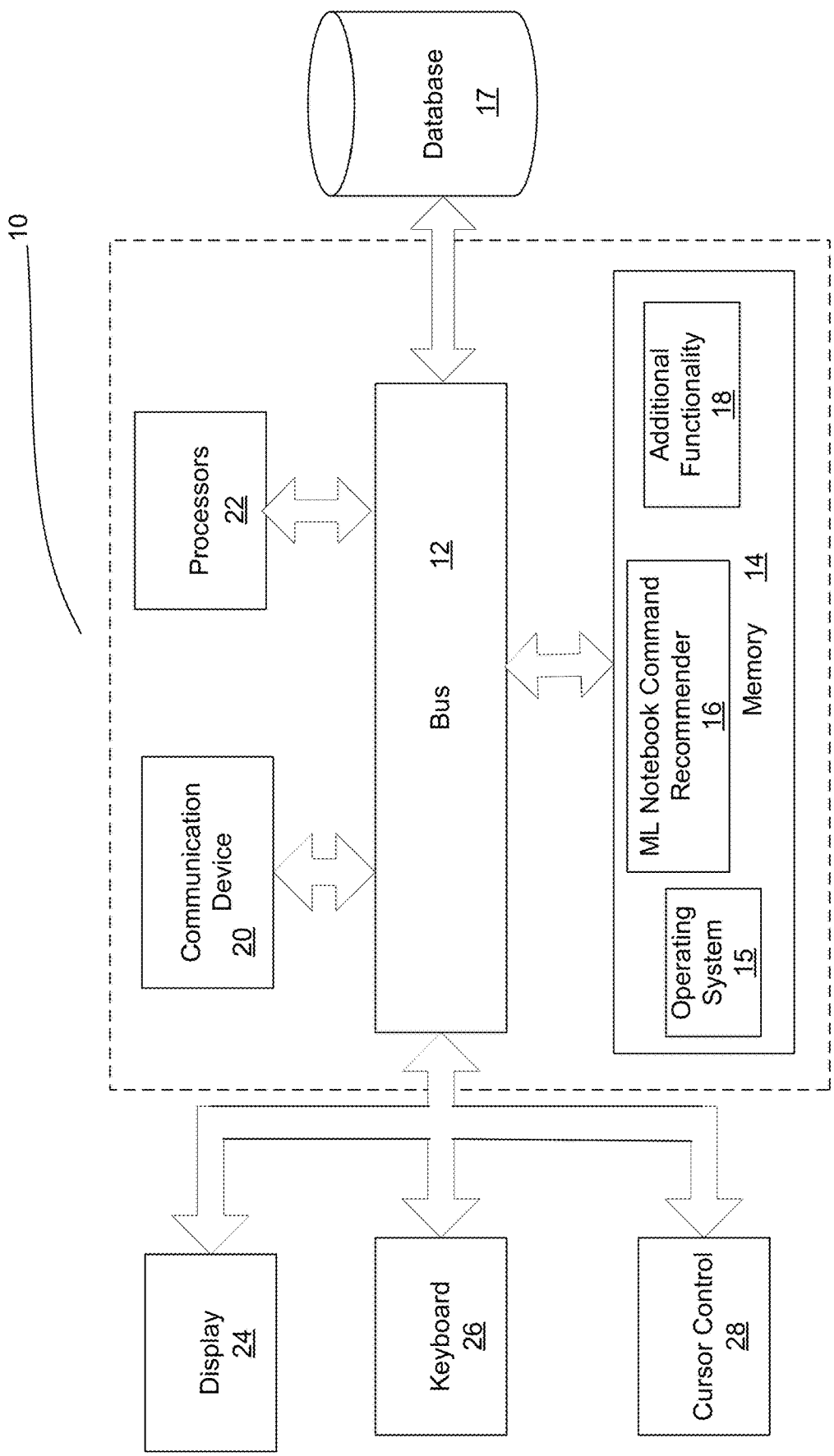
FIG. 2 is a block diagram of the ML notebook command recommender system of FIG. 1 in the form of a computer server/system in accordance with an embodiment of the present invention.

FIG. 2 is a block diagram of ML notebook command recommender system 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an ML notebook command recommender module 16 that assists the ML feature engineering process while using an ML notebook 125 on cloud 104, and all other functionality disclosed herein. System 10 can be part of a larger system. Therefore, system 10 can include one or more additional functional modules 18 to include the additional functionality, such as any other functionality provided by the Oracle Cloud Infrastructure ("OCI") from Oracle Corp. A file storage device or database 17 is coupled to bus 12 to provide centralized storage for modules 16 and 18, including data regarding previous commands provided by ML notebook users during feature engineering development sessions. In one embodiment, database 17 is a relational database management system ("RDBMS") that can use Structured Query Language ("SQL") to manage the stored data.

In one embodiment, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

Figure 3:
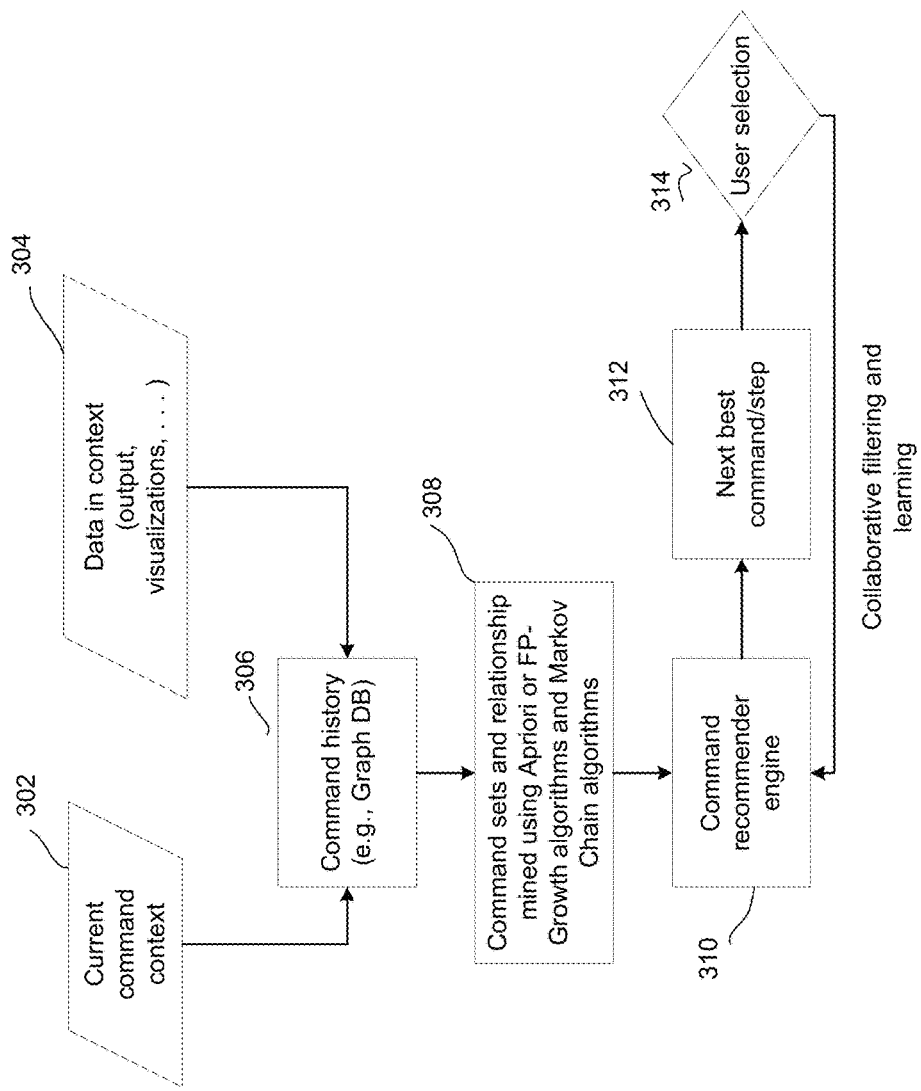
FIG. 3 is a flow diagram of the functionality of the ML notebook command recommender system of FIG. 1 for assisting the ML feature engineering process while using an ML notebook on the cloud in accordance with one embodiment.

FIG. 3 is a flow diagram of the functionality of ML notebook command recommender system 10 of FIG. 1 for assisting the ML feature engineering process while using an ML notebook 125 on cloud 104 in accordance with one embodiment. In one embodiment, the functionality of the flow diagram of FIG. 3 (and FIGS. 4 and 6 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Embodiments receive, as input data, the current command context at 302 and the data in context at 304. The current command context at 302 is the particular cell in the notebook where a user is attempting to execute a command (e.g., the location of the cursor focus). The output of the command as well as the data itself for the particular cell is known at 304. The current command context and data context is passed as input when a notebook cell command is executed and if there is any data also available in the context. The input data at 302 and 304 is continuously provided as the user executes various cells of the notebook.

At 306, the history of each of the inputs at 302 and 304 is stored as a graph relationship in a graph database ("GDB") to preserve the relationships between sequences of commands (i.e., what command was executed before and after a particular command). The set of commands/actions stored in the GDB are from all users of each ML notebook 125 on cloud 104 (i.e., across all users of ML notebooks 125, where each user uses a separated notebook). The relationship is stored between commands as graph nodes and edges. The associations are preserved in graph relationship in the GDB.

A GDB is a database that uses graph structures for semantic queries with nodes, edges, and properties to represent and store data. A key concept of the system is the graph (or edge or relationship). The graph relates the feature engineering commands to a collection of nodes and edges, the edges representing the relationships between the nodes. The relationships allow data to be linked together directly and, in many cases, retrieved with one operation. Graph databases hold the relationships between data as a priority. Querying relationships is fast because they are perpetually stored in the database. Relationships can be intuitively visualized using graph databases, making them useful for heavily inter-connected data.

Graph databases are commonly referred to as a non-structured query language ("NoSQL") database, meaning that the approach to storing, querying and describing these data structures differs significantly from a traditional relational database. While the graph model explicitly lays out the dependencies between nodes of data, the relational model and other NoSQL database models link the data by implicit connections. Relationships can be labelled, directed, and given properties. In one embodiment, the "graph database" from Oracle Corp. is used at 306.

In other embodiments, other known functionality that can be used to store the relationships between feature engineering commends can be implemented instead of a GDB.

Using the stored commands and relationships from 306 (i.e., sets of commands), at 308 a mining phase is implemented (described in more detail below). Embodiments use an "Apriori" algorithm or a frequent pattern growth ("FP-Growth") algorithm, and Markov Chain based algorithms to determine, via training, the feature engineering commands that are frequently used together as well as the order of use of the commands (i.e., the ordering of these sets of commands) with lift and confidence scores. Examples of ordered sets of feature engineering commands that are mined at 308 (i.e., learned over time as the most commonly associated feature engineering steps or commands) include the following ordered mined sets (referred to as "frequent command sets"):

{scatterplot, principal component analyses ("PCA"), random forest feature importance extraction}

{pairplot, coefficient analysis, hypothesis testing}

{image analysis, noise reduction, layers, gradient descent}

At 310, the mined sets are provided to a recommendation engine which uses collaborative filtering techniques to provide suggestions to the user at 312.

At 314, the user selects the next command, which can be the recommended command at 312, or a different command. The result of this selection (either a selection of a recommended command, or a command that is different than a recommended command) is fed back to the recommender engine 310 to be used for the next selection via collaborative filtering and learning.

Figure 4:
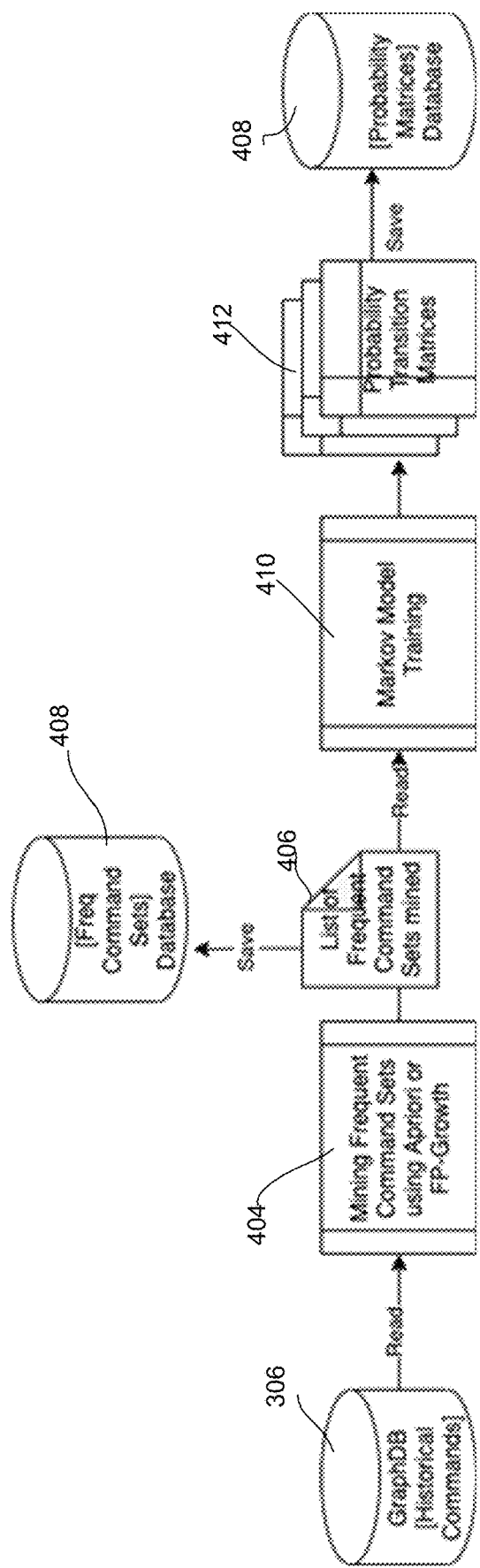
FIG. 4 is a flow diagram of the functionality of the ML notebook command recommender system of FIG. 1 when mining the command set of applicable commands with ordering probability in accordance with one embodiment.

FIG. 4 is a flow diagram of the functionality of ML notebook command recommender system 10 of FIG. 1 when mining the command set of applicable commands with ordering probability in accordance with one embodiment. The functionality of FIG. 4 provides additional details of 308 of FIG. 3, and in general describes offline training of prior commands from the ML notebooks and the relationships of the commands stored in the GDB 306.

Embodiments use algorithms such as FP-Growth or Apriori for mining frequently used set of steps/commands. However, the ordering of the commands is not determined as these algorithms considers them as a "Bag of Commands" or items where ordering is irrelevant. Therefore, embodiments determining the ordering as well via the sequencing/ordering property of a state transition matrix that is learned using the a Markov Chain based algorithm.

In embodiments, commands typed into each ML notebook 125 sessions are captured by a JupyterLab server (or any type of server on cloud 104 that interacts with ML notebook 125) which are recorded into graphical database 306 for future mining and analytics.

Commands are then mined for frequent command sets at 404 using algorithms such as Apriori or FP-Growth. Frequent command sets are commands which are generally found to be used together during the feature engineering part of a Python notebook. These mined frequent command sets 406 are persisted into a database 408 for further lookup during the online feature engineering command recommendation serving phase, described below.

Apriori is an algorithm for frequent item set mining and association rule learning over relational databases. It proceeds by identifying the frequent individual items in the database and extending them to larger and larger item sets as long as those item sets appear sufficiently often in the database. The frequent item sets determined by Apriori can be used to determine association rules which highlight general trends in the database.

The FP-Growth algorithm is a known algorithm for generating association rules and avoids inefficient candidate generation by parsing the dataset multiple times. The FP-Growth algorithm builds an efficient FP-tree where the root is NULL and rest of the tree is formed so that each node represents the item in frequent item sets.

In one embodiment, the FP-Growth algorithm is as follows: In the first pass, the algorithm counts the occurrences of items (attribute-value pairs) in the dataset of transactions and stores these counts in a "header table". In the second pass, it builds the FP-tree structure by inserting transactions into a trie. Items in each transaction have to be sorted by descending order of their frequency in the dataset before being inserted so that the tree can be processed quickly. Items in each transaction that do not meet the minimum support requirement are discarded. If many transactions share most frequent items, the FP-tree provides high compression close to tree root. Recursive processing of this compressed version of the main dataset grows frequent item sets directly, instead of generating candidate items and testing them against the entire database. Growth begins from the bottom of the header table (i.e., the item with the smallest support) by finding all sorted transactions that end in that item ("/I"). A new conditional tree is created which is the original FP-tree projected onto /. The supports of all nodes in the projected tree are re-counted with each node getting the sum of its children counts. Nodes (and hence subtrees) that do not meet the minimum support are pruned. Recursive growth ends when no individual items conditional on meet the minimum support threshold. The resulting paths from root to / will be frequent itemsets. After this step, processing continues with the next least-supported header item of the original FP-tree. Once the recursive process has completed, all frequent item sets will have been found, and association rule creation begins.

The mined frequent command sets 406 are also read by a Markov model training module 410, which determines the sequence/ordering of the commands and outputs probability transition matrices 412 which are also stored into database 408 for future lookup.

A Markov chain or a Markov process is a stochastic model describing a sequence of possible events in which the probability of each event depends on the state attained in the previous event. Embodiments can also infer this as changes of the state of a system from one state to another with a certain probability distribution. Such changes of state of the system are referred to as "transitions", while the probabilities associated with various state changes are referred to as "transition probabilities." The process is characterized by a state space, a transition matrix describing the probabilities of particular transitions, and an initial state (i.e., an initial probability distribution or prior probability).

In embodiments, since each step of feature engineering of an ML notebook may be dependent on a variable number of previous steps and may not be a fixed set of previous steps. Therefore, embodiments use the variable-order Markov model variation of the Markov chain model algorithm. In embodiments, the Markov chain model with variable order needs to be trained using Python code from a relatively large number of Python notebooks which would help in generating the Markov chain's step transition probabilities.

The step transitions in embodiments vary based on the data type of the field and the current context. Therefore, embodiments implement a per data type Markov chain model training. For example, one of the initial feature engineering steps may generally be to perform pair-wise plots for numeric fields to understand the correlation and causation among the fields in general. In the case of a "Nominal" value type field, a standard feature engineering step is to apply one-hot encoding. Further, in the case of "Numeric" fields, generating a bar-chart plot using seaborne or matplotlib (in Python) would be an important step to execute.

Figure 5:
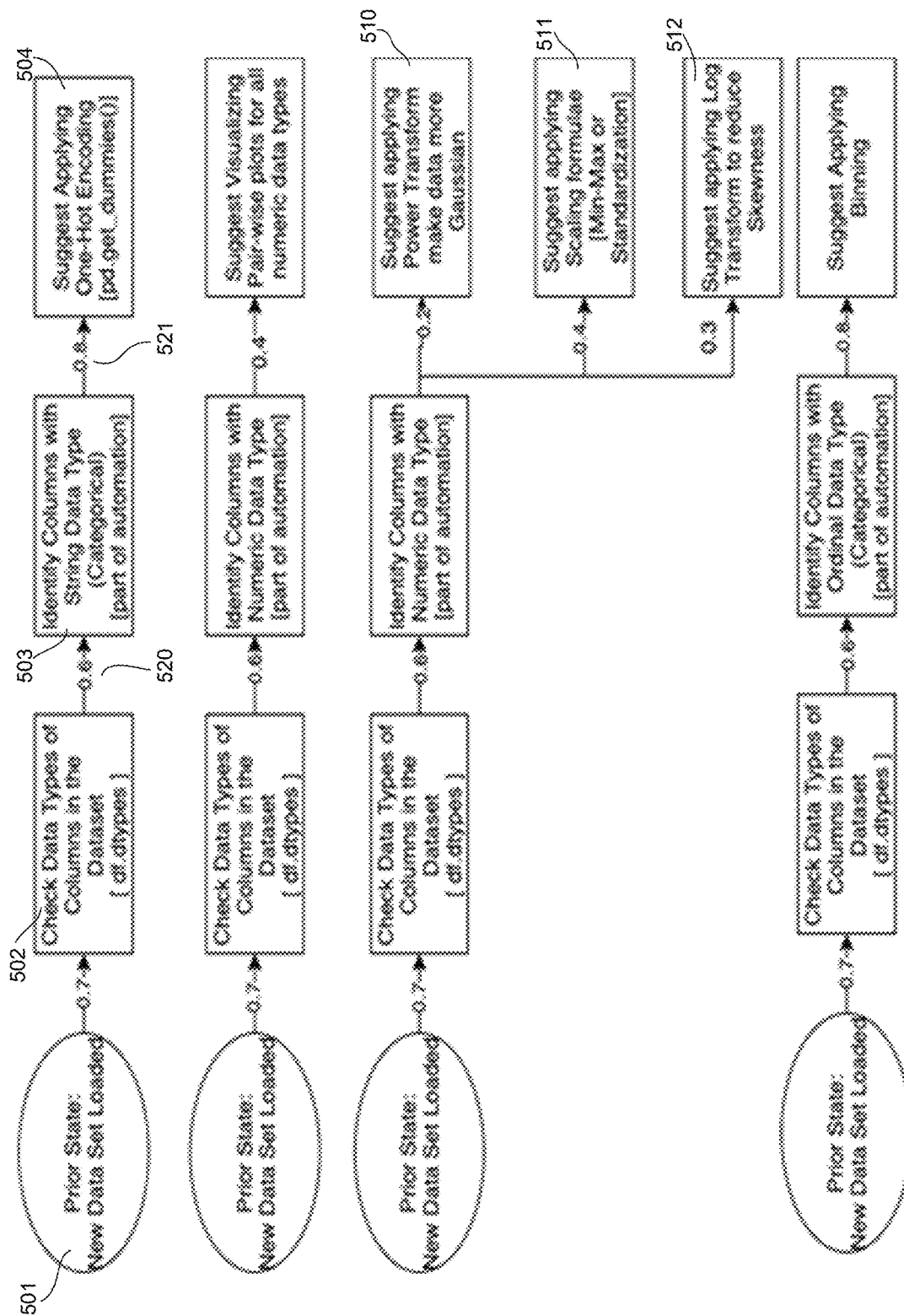
FIG. 5 illustrates some learned feature engineering examples described using state transitions in accordance to embodiments.

FIG. 5 illustrates some learned feature engineering examples described using state transitions in accordance to embodiments. The probability between states is the probability of moving from one state to the next state. The first example begins at 501 at the prior state with a new data set loading. In general, data sets include data in the form of tabular data that includes columns. The commands shown in FIG. 5 are operated on the data sets. Continuing from 501, the next commands are to check data types of columns in the dataset at 502 and to identify columns with string data types at 503. Based on this command sequence, embodiments suggest applying one-hot encoding at 504. Between each command is a transition probability (e.g., probability 521) of the next command occurring, determined by the Markov chain model algorithm. In some embodiments, multiple possible next commands can be suggested based on the probabilities, such as 510-512. These multiple commands can be ranked based on the determined probabilities. In other embodiments, there will be a probability threshold, and only commands that are above the threshold are presented to the notebook user.

Figure 6:
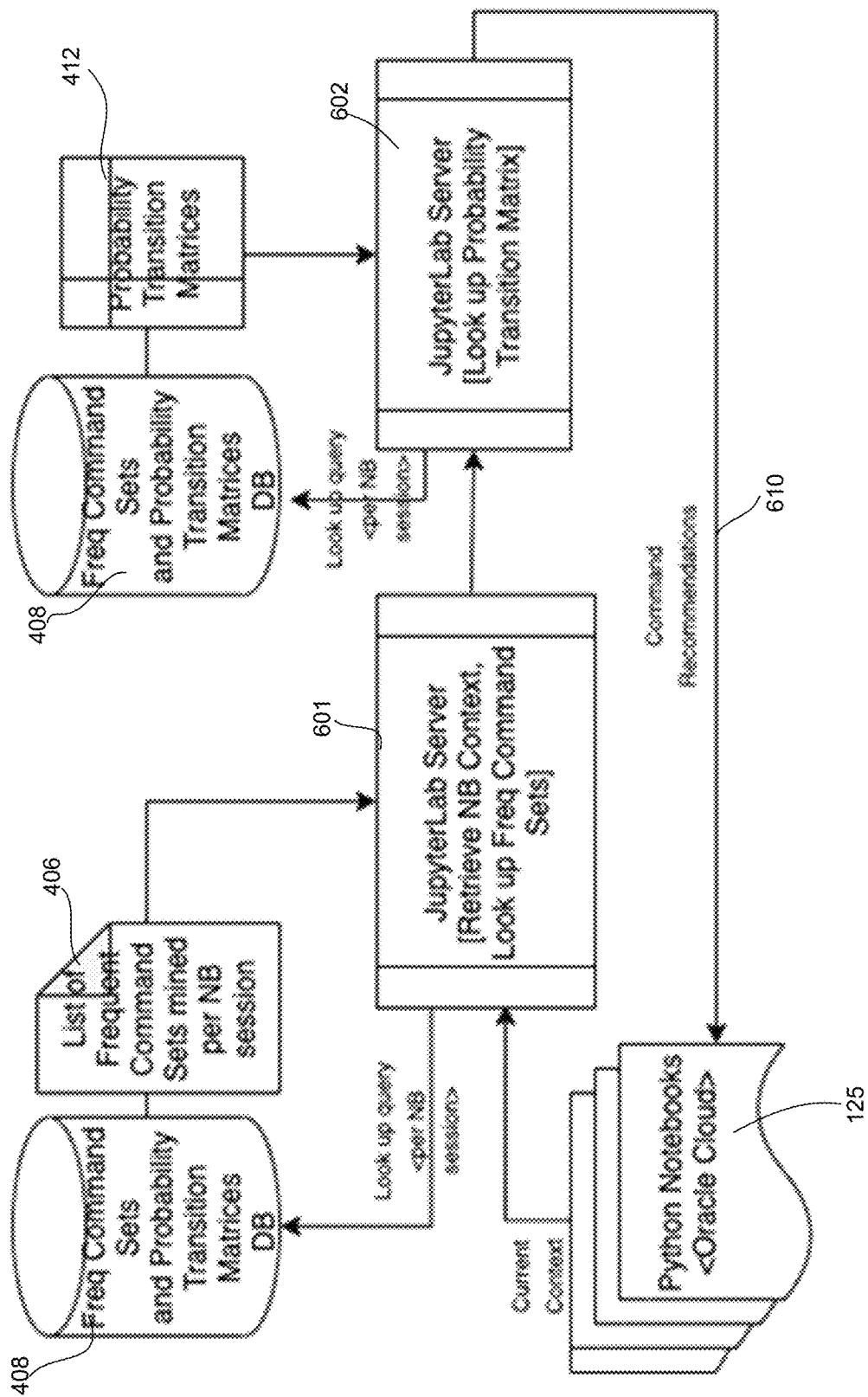
FIG. 6 is a flow diagram of the functionality of the ML notebook command recommender system of FIG. 1 when identifying a next command recommendation for current operational notebook sessions in accordance with one embodiment.

FIG. 6 is a flow diagram of the functionality of ML notebook command recommender system 10 of FIG. 1 when identifying a next command recommendation for current operational notebook sessions in accordance with one embodiment. The functionality of FIG. 6 illustrates "live" online serving of recommended ML notebook feature engineering steps for the current set of notebook sessions.

Live python notebook sessions 125 transmit the current context to the JuypterLab server.

At 602, the JuypterLab server uses the current context for each of the notebook sessions to look up at 601 the frequent command sets and the probability transition matrices database 408 to extract a list of frequent command sets 406 which were mined and preserved in database 408 during the training phase (i.e., FIG. 4 functionality).

Figure 7:
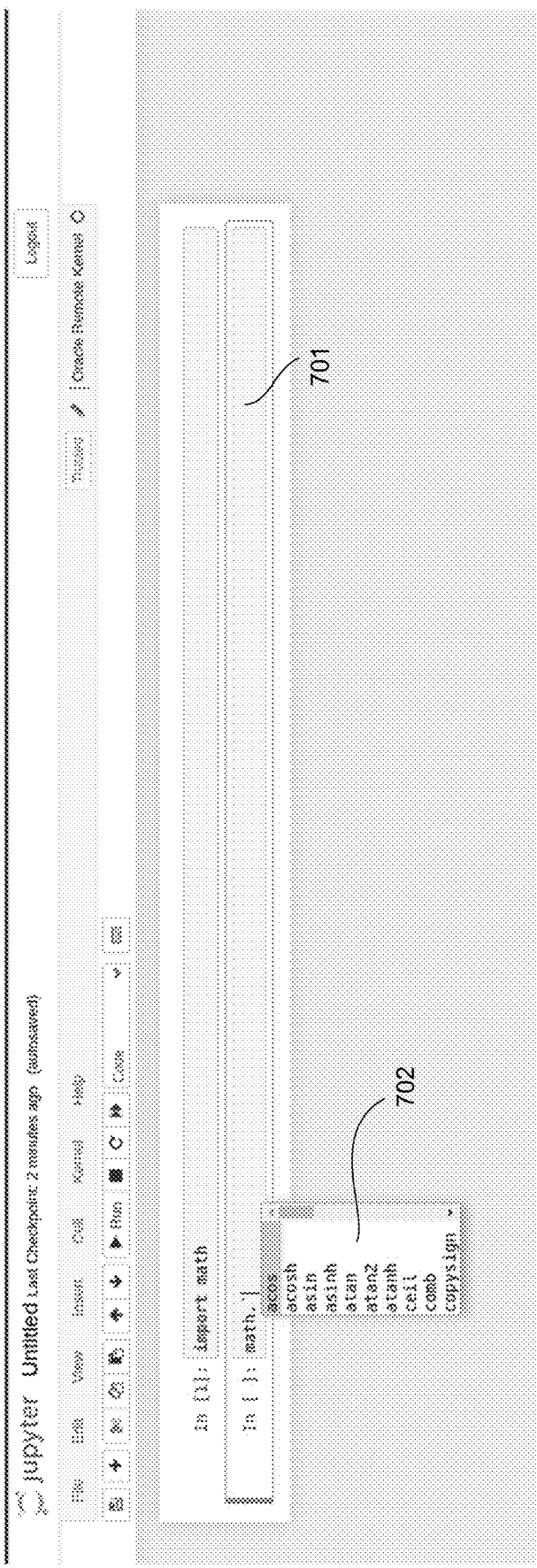
FIG. 7 illustrates an example of an ML notebook cell in accordance to embodiments of the invention.

Once the JuypterLab server has the frequent command sets 406, at 602 it uses database 408 to lookup the probability transition matrices 412 for each of the notebook sessions. For each notebook session, the JuypterLab server then determines the best set of commands (i.e., the next best commands to execute and the order of the commands) which are recommended at 610 to the user using the Python notebooks 125. The recommend commands in embodiments are presented to a user via a command recommendation pop-up near the cursor in the notebook cell. FIG. 7 illustrates an example of a current ML notebook cell 701 in accordance to embodiments of the invention. A pop-up window 702 near or on the current cell 701 provides multiple next feature engineering command recommendations in accordance to embodiments.

The initial recommendations or cold start may be based on lift, confidence factor and if the user select/discards them. The learning rate then gets adjusted progressively. In data mining and association rule mining, "lift" is a measure of performance of a targeting model (association rule) at predicting or classifying cases as having an enhanced response with respect to the population as a whole, measured against a random choice targeting model. In other words, lift is the ratio of the probability of two or more commands occurring together in multiple Python notebooks and the probability of finding each of these commands independently across all the observed notebooks. Confidence is an indication of how often the rule X→Y has been found to be true so confidence (X→Y): support (X U Y)/support (X) where support is an indication of how frequently the itemset appears in the dataset.

Example Cloud Infrastructure

FIGS. 8-11 illustrate an example cloud infrastructure that can incorporate the ML notebook command recommender system 10 in accordance to embodiments. The cloud infrastructure of FIG. 8-11 can be used to implement network/cloud 104 of FIG. 1. As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM"s), install operating systems ("OS"s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
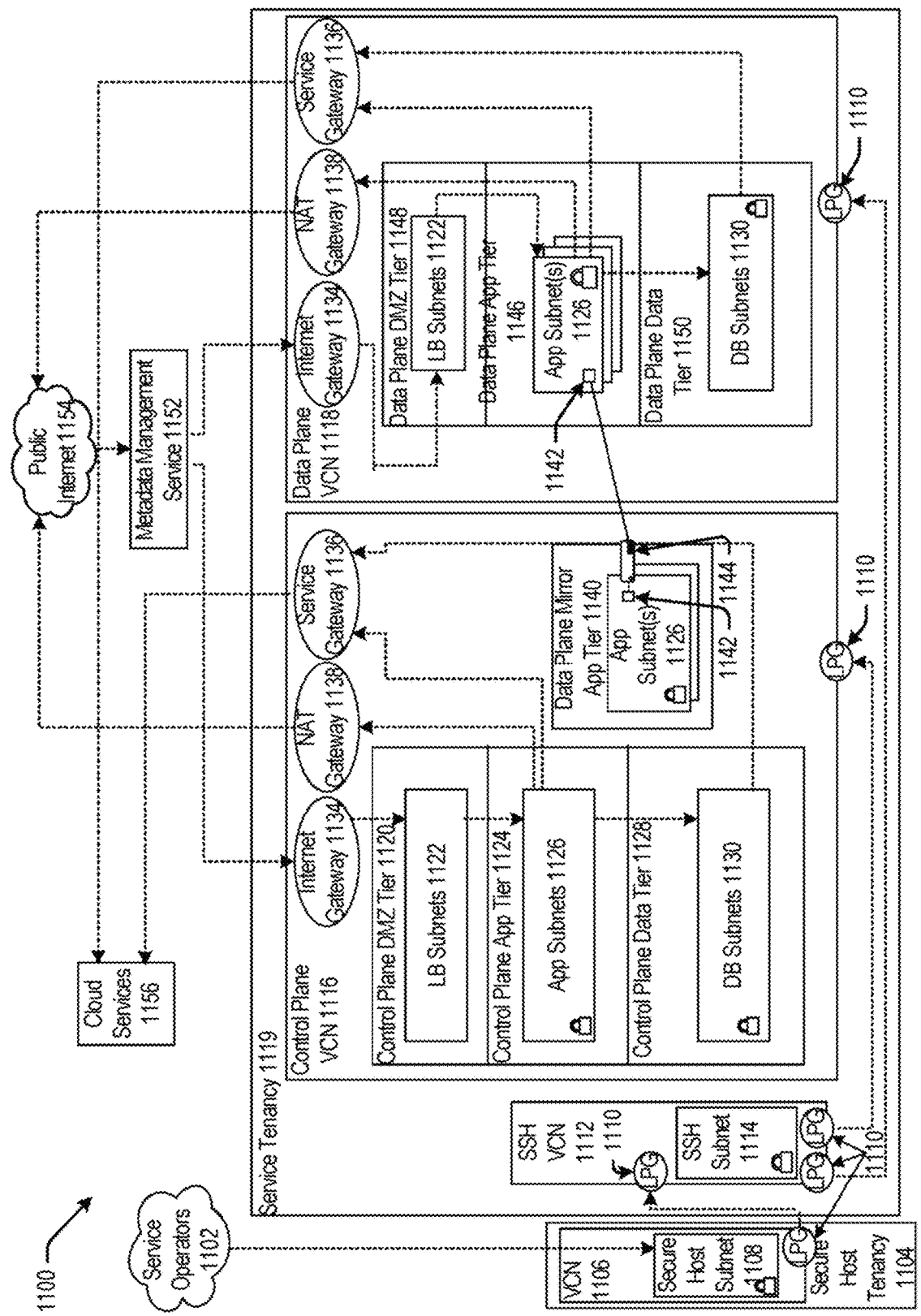
FIGS. 8-11 illustrate an example cloud infrastructure that can incorporate the ML notebook command recommender system in accordance to embodiments.

FIG. 8 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 9:
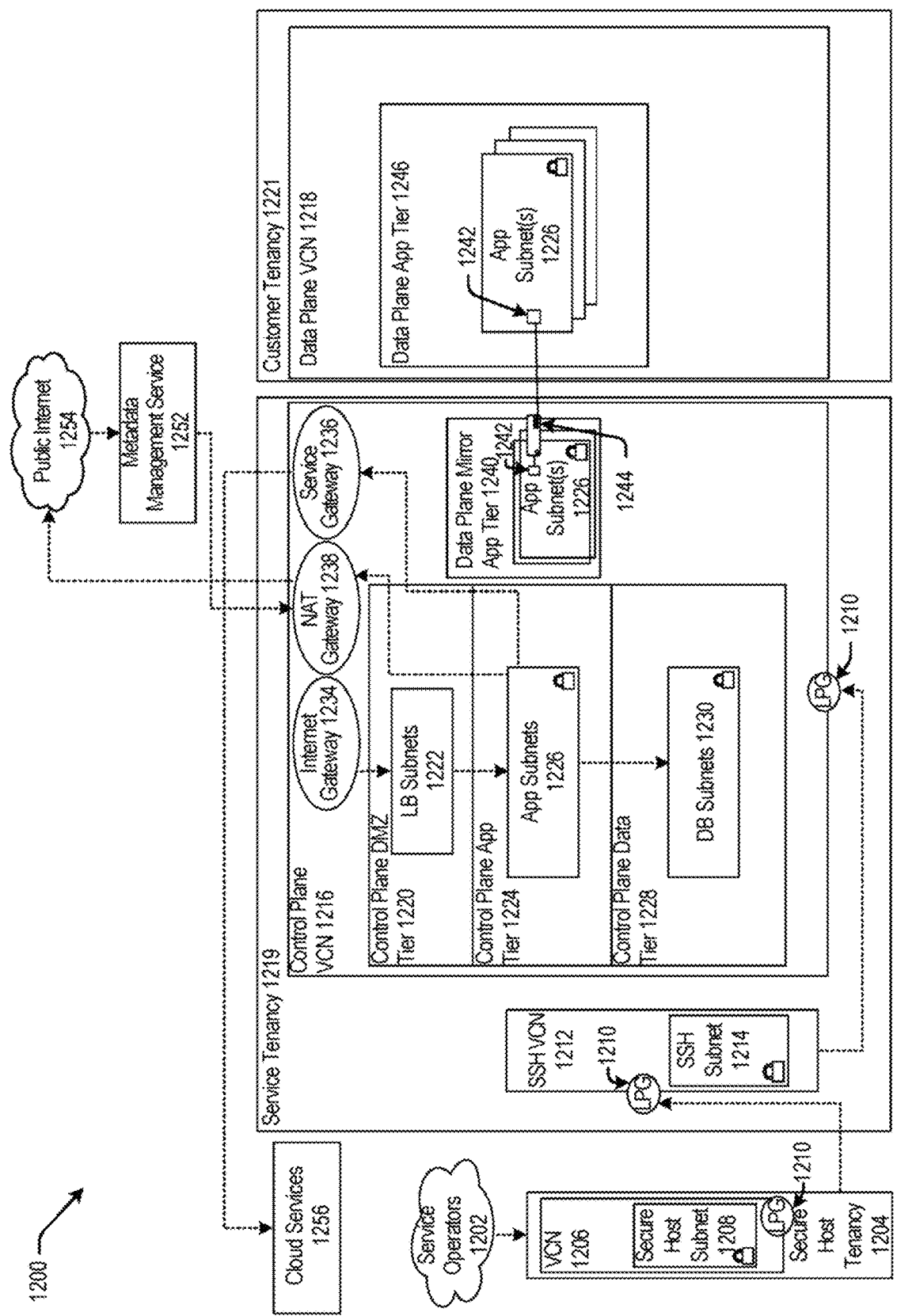

FIG. 9 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 10:
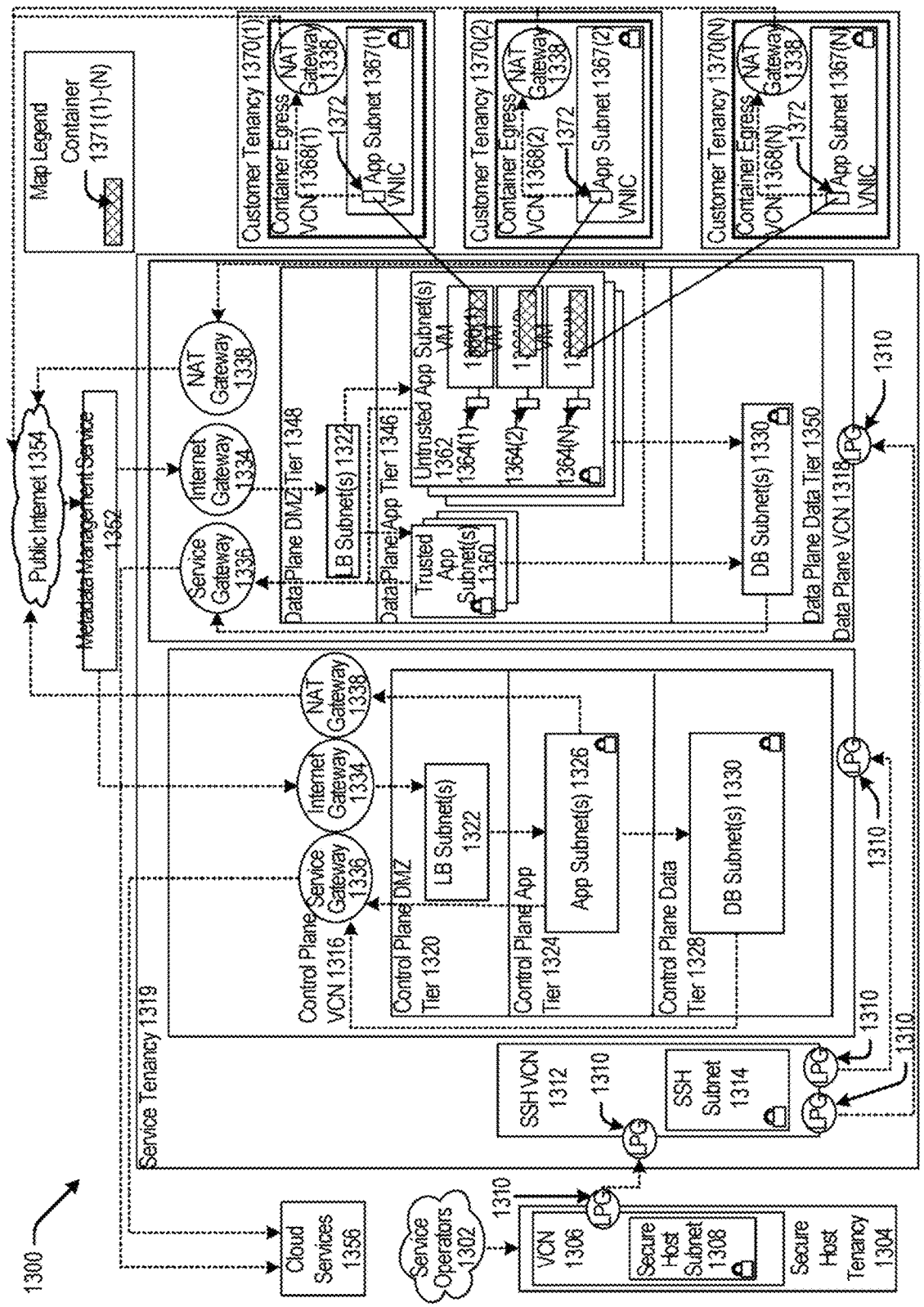

FIG. 10 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

Figure 11:
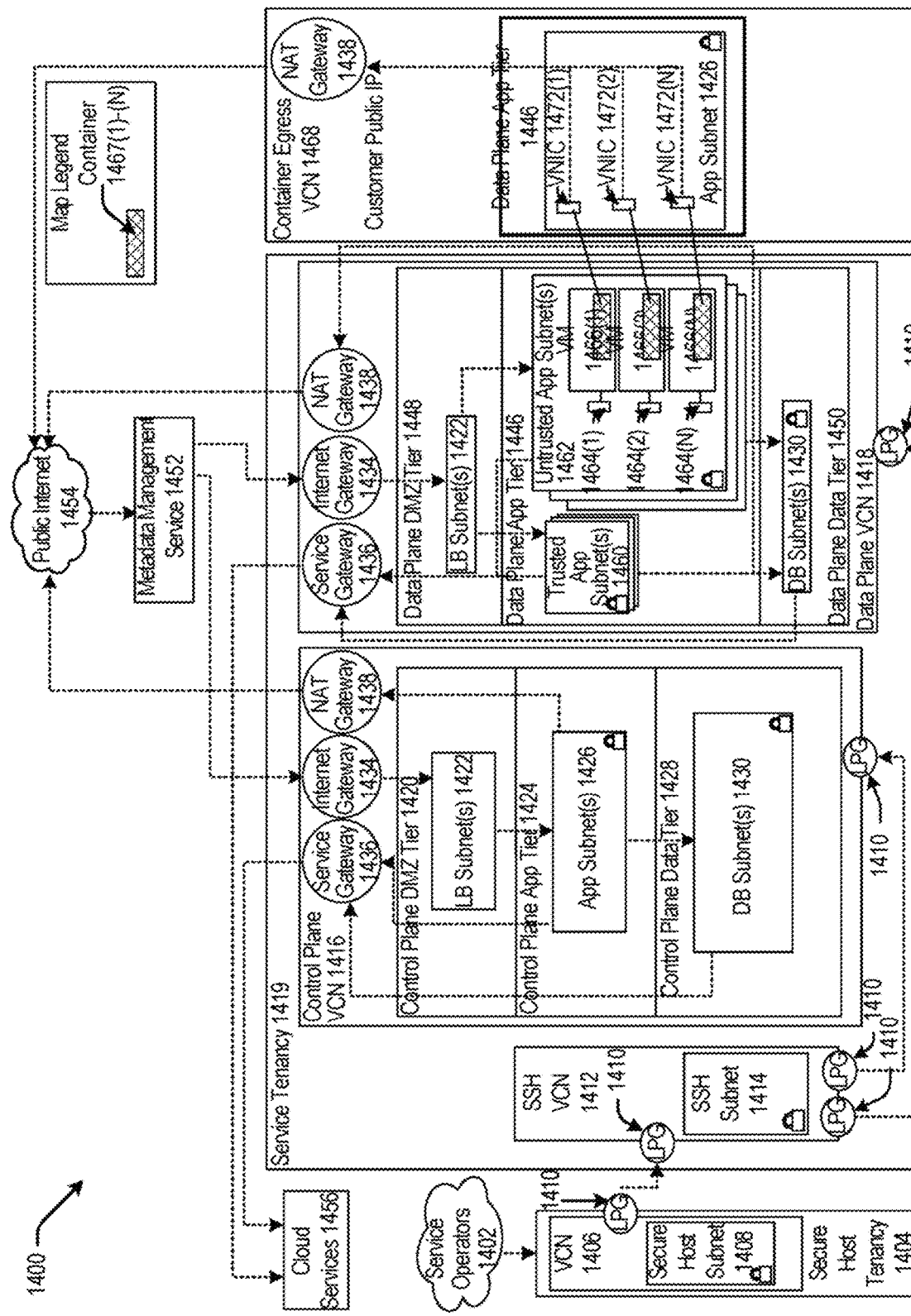

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371 (1)-(N) may be communicatively coupled to the customer tenancy 1370 and may be configured to transmit or receive data from the customer tenancy 1370. The containers 1371 (1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

FIG. 11 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 11 may be considered an exception to the pattern illustrated by the architecture of block diagram 1300 of FIG. 10 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure ("OCI") provided by the present assignee.

As disclosed, embodiments provide recommendations for next feature engineering steps during ML notebook sessions. These recommendations optimize ML model development and can also eliminate or reduce human biases during the model development. Because ML notebook 125, in general, is a computational interpreter, the mining happens at a scale on similar notebook commands not only through a simple matching but also associating further steps, which establishes more intuitive recommendations than a one-off next command. Embodiments can provide a set of steps or a navigation map as well for the user progressively.

The list of steps mined is also useful to generate the commands as well if the user is willing to select them and take it forward. They are auto completed since they are available as a knowledge and avoids/eliminates errors in typos or mistakes in executing the commands.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of operating a machine learning (ML) notebook in a cloud infrastructure executing a plurality of ML notebooks, wherein each of the ML notebooks comprise an interactive ML software environment with a plurality of cells, the method comprising:
   receiving a plurality of previously executed ML notebook commands corresponding to feature engineering tasks for one or more ML models from the plurality of ML notebooks;
   storing the plurality of previously executed ML notebook commands, including a relationship between the ML notebook commands;
   mining the stored ML notebook commands to generate sets of ML notebook commands, the sets comprising commands that are used together and an order of use of the commands;
   receiving a context of a current ML notebook command and data used in the context; and
   recommending a next ML notebook command to be executed after the current ML notebook command, wherein the next ML notebook command is recommended based at least on exceeding a threshold of a transition probability in reference to a previous ML notebook command.

2. The method of claim 1, the context comprising a current cell.

3. The method of claim 2, the recommending comprising a pop-up window positioned near or on the current cell, the pop-up window listing one or more next ML notebook commands.

4. The method of claim 1, further comprising ranking the one or more next ML notebook commands based on the transition probability in reference to a previous ML notebook command.

5. The method of claim 1, wherein the storing comprises using a graph database.

6. The method of claim 1, the mining comprising using Apriori or Frequent Pattern Growth algorithms and a variable order Markov chain algorithm.

7. The method of claim 1, wherein the ML notebook commands comprise operations performed on input data for the ML models.

8. A non-transitory computer readable medium having instructions stored thereon that, when executed by one or more processors, cause the processors to operate a machine learning (ML) notebook in a cloud infrastructure executing a plurality of ML notebooks wherein each of the ML notebooks comprise an interactive ML software environment with a plurality of cells, the operating comprising:
   receiving a plurality of previously executed ML notebook commands corresponding to feature engineering tasks for one or more ML models from the plurality of ML notebooks;
   storing the plurality of previously executed ML notebook commands, including a relationship between the ML notebook commands;
   mining the stored ML notebook commands to generate sets of ML notebook commands, the sets comprising commands that are used together and an order of use of the commands;
   receiving a context of a current ML notebook command and data used in the context; and
   recommending a next ML notebook command to be executed after the current ML notebook command, wherein the next ML notebook command is recommended based at least on exceeding a threshold of a transition probability in reference to a previous ML notebook command.

9. The computer readable medium of claim 8, the context comprising a current cell.

10. The computer readable medium of claim 9, the recommending comprising a pop-up window positioned near or on the current cell, the pop-up window listing one or more next ML notebook commands.

11. The computer readable medium of claim 8, the operating further comprising ranking the one or more next ML notebook commands based on the transition probability in reference to a previous ML notebook command.

12. The computer readable medium of claim 8, wherein the storing comprises using a graph database.

13. The computer readable medium of claim 8, the mining comprising using Apriori or Frequent Pattern Growth algorithms and a variable order Markov chain algorithm.

14. The computer readable medium of claim 8, wherein the ML notebook commands comprise operations performed on input data for the ML models.

15. A cloud infrastructure comprising:
   a plurality of machine learning (ML) notebooks wherein each of the ML notebooks comprise an interactive ML software environment with a plurality of cells;
   an ML notebook command recommender server coupled to the ML notebooks, the ML notebook command recommender server, for each ML notebook:
      receiving a plurality of previously executed ML notebook commands corresponding to feature engineering tasks for one or more ML models from the plurality of ML notebooks;
      storing the plurality of previously executed ML notebook commands, including a relationship between the ML notebook commands;
      mining the stored ML notebook commands to generate sets of ML notebook commands, the sets comprising commands that are used together and an order of use of the commands;
      receiving a context of a current ML notebook command and data used in the context; and
      recommending a next ML notebook command to be executed after the current ML notebook command, wherein the next ML notebook command is recommended based at least on exceeding a threshold of a transition probability in reference to a previous ML notebook command.

16. The cloud infrastructure of claim 15, wherein the storing comprises using a graph database.

17. The cloud infrastructure of claim 15, the mining comprising using Apriori or Frequent Pattern Growth algorithms and a variable order Markov chain algorithm.

18. The cloud infrastructure of claim 15, wherein the ML notebook commands comprise operations performed on input data for the ML models.

19. The cloud infrastructure of claim 15, the recommending comprising a pop-up window positioned near or on a current cell, the pop-up window listing one or more next ML notebook commands.

20. The cloud infrastructure of claim 15, further comprising ranking the one or more next ML notebook commands based on the transition probability in reference to a previous ML notebook command.

\* \* \* \* \*

UNITED STATES PATENT AND TRADEMARK OFFICE
CERTIFICATE OF CORRECTION

PATENT NO. : 12,093,743 B2
APPLICATION NO. : 17/550955
DATED : September 17, 2024
INVENTOR(S) : Sankaranarayanan et al.

Page 1 of 1

It is certified that error appears in the above-identified patent and that said Letters Patent is hereby corrected as shown below:

In the Specification

In Column 4, Line 2, delete "("OCP")" and insert -- ("OCI") --, therefor.

Signed and Sealed this
Fourteenth Day of January, 2025

Derrick Brent
*Acting Director of the United States Patent and Trademark Office*